United States Patent

Shikata et al.

[11] Patent Number: 6,101,828
[45] Date of Patent: Aug. 15, 2000

[54] AIR CONDITIONING APPARATUS FOR VEHICLE

[75] Inventors: Kazushi Shikata; Takashi Toyoshima, both of Kariya, Japan

[73] Assignee: Denso Corporation, Kariya, Japan

[21] Appl. No.: 09/203,651

[22] Filed: Dec. 1, 1998

[30] Foreign Application Priority Data

Dec. 25, 1997 [JP] Japan .................................... 9-358232

[51] Int. Cl.⁷ .................................................. B60H 1/32
[52] U.S. Cl. ............................................... 62/244; 165/42
[58] Field of Search ......................... 62/239, 244, 324.1; 165/42, 43

[56] References Cited

U.S. PATENT DOCUMENTS

| | | | |
|---|---|---|---|
| 4,340,113 | 7/1982 | Iwata et al. ............................... | 165/25 |
| 4,574,873 | 3/1986 | Kawahira et al. ....................... | 165/42 |
| 4,842,047 | 6/1989 | Sakurada et al. ....................... | 165/43 |
| 5,755,107 | 5/1998 | Shirota et al. . | |
| 5,884,689 | 3/1999 | Takechi et al. ........................... | 165/43 |
| 5,960,859 | 10/1999 | Sakurai ..................................... | 165/43 |
| 5,987,905 | 11/1999 | Nonoyama et al. ..................... | 62/133 |
| 5,996,365 | 12/1999 | Tanaka ..................................... | 62/196.4 |
| 6,009,934 | 1/2000 | Sunaga et al. ........................... | 165/42 |

*Primary Examiner*—Henry Bennett
*Assistant Examiner*—Melvin Jones
*Attorney, Agent, or Firm*—Harness, Dickey & Pierce, PLC

[57] ABSTRACT

In an air conditioning apparatus for a vehicle, a heat exchanger for adjusting a temperature of air blown into a passenger compartment is formed in a lateral-longer shape to have a longest dimension in a right-left direction of the vehicle, and the heat exchanger is accommodated in an air conditioning case. The air conditioning case is also formed in the lateral-longer shape and has a longest dimension in the right-left direction. An air passage is formed in the air conditioning case so that air passes through the heat exchanger from a front side to a rear side in a from-rear direction of the vehicle. The air conditioning case is disposed in an instrument panel at a center in the right-left direction to extend from the center to upper sides of foot spaces provided at right and left sides of a center console without being inserted into the center console. Thus, an installation performance of the air conditioning apparatus in the instrument panel of the vehicle can be improved.

20 Claims, 8 Drawing Sheets

AIR CONDITIONING APPARATUS FOR VEHICLE

CROSS-REFERENCE TO RELATED APPLICATION

This application is related to and claims priority from Japanese Patent Application No. Hei. 9-358232 filed on Dec. 25, 1997, the contents of which are hereby incorporated by reference.

BACKGROUND OF THE INVENTION

1. Field of the Invention

The present invention relates to an air conditioning apparatus for a vehicle, which is installed within an instrument panel at a center in a right-left direction of the vehicle, to improve an installation performance of the air conditioning apparatus in the vehicle.

2. Description of Related Art

In a semi-center type air conditioning apparatus for a vehicle, an air conditioning unit for adjusting a temperature of air blown into a passenger compartment is disposed approximately at a center of an instrument panel in a right-left direction (i.e., width direction) of the vehicle, and a blower unit for blowing air into the air conditioning unit is disposed at an offset position shifted from the air conditioning unit in the right-left direction. Further, in a complete-center type air conditioning apparatus for a vehicle, both the air conditioning unit and the blower unit are disposed at a center of the instrument panel in the right-left direction so that the blower unit is positioned at a vehicle front side of the air conditioning unit.

However, in each of the conventional semi-center type air conditioning apparatus and the conventional complete-center type air conditioning apparatus, because a dimension of the air conditioning unit in an up-down direction of the vehicle is large, a bottom surface of the air conditioning unit is placed at a position proximate to a floor surface of the passenger compartment. Therefore, the foot portion of a passenger on a front seat in the passenger compartment contacts the bottom surface of the air conditioning apparatus. To prevent the problem, a dimension of the air conditioning unit in the right-left direction of the vehicle is restricted to be smaller than 300 mm, generally. However, in this case, the dimension of the air conditioning unit in the up-down direction of the vehicle is inevitably increased to propose a sufficient air-conditioning capacity for the passenger compartment.

For example, in a conventional semi-center type air conditioning apparatus shown in FIG. 9, an air conditioning unit having an air conditioning case 202 is disposed at a center of an instrument panel 200 in the right-left direction, and components such as an evaporator 203 and a heater core 204 are disposed in the air conditioning case 202. In the air conditioning unit, the dimension L in a front-rear direction of the vehicle is approximately 400 mm, the dimension H in the up-down direction of the vehicle is approximately 450 mm, and a height distance h between the bottom surface of the air conditioning case 202 and a floor surface 201 of the passenger compartment is approximately 40–50 mm. Because the dimension H of the air conditioning unit in the up-down direction is large, components around the center of the instrument panel are readily affected by the air conditioning unit; and therefore, the installation of the air conditioning unit in the instrument panel of the passenger compartment becomes difficult.

SUMMARY OF THE INVENTION

In view of the foregoing problems, it is an object of the present invention to provide an air conditioning apparatus for a vehicle, which has a reduced dimension in an up-down direction of the vehicle to be readily installed in an instrument panel at a center in a right-left direction of the vehicle.

According to the present invention, in an air conditioning apparatus for a vehicle, a heat exchanger for adjusting a temperature of air to be blown into a passenger compartment of the vehicle is accommodated in a case for forming an air passage through which air is blown from a front side toward a rear side in a front-rear direction of the vehicle. The case has a longest dimension in a right-left direction of the vehicle, and the heat exchanger is disposed in the case in such a manner that a longest dimension of the heat exchanger is in the right-left direction. Further, the case is disposed within the instrument panel at a center in the right-left direction to extend from the center to upper sides of right and left foot spaces in the right-left direction without being inserted into a center console. Because each of the heat exchanger and the case is formed in a lateral-longer shape, a sufficient air-conditioning performance can be proposed even when the air conditioning apparatus has a small dimension in an up-down direction of the vehicle. Accordingly, the air conditioning apparatus can be formed in a lateral-longer flat shape, and is readily installed in the instrument panel at the center in the right-left direction. Thus, installation performance of the air conditioning apparatus in the instrument panel of the vehicle can be remarkably improved.

Further, because the case is disposed to extend from the center to the upper sides of the right and left foot spaces in the right-left direction, air can be blown toward a wide area of the foot portion of a passenger on a front seat in the passenger compartment when a foot mode is set. Thus, during the foot mode, heating capacity is improved. On the other hand, when a face mode is set, air can be blown toward a wide area of the head portion of the passenger, and cooling capacity is improved.

Preferably, a blower is disposed in the case in such a manner that a rotation shaft is positioned in the right-left direction. Therefore, the air conditioning apparatus can be formed in the lateral-longer flat shape having a small dimension in the up-down direction of the vehicle. Thus, the air conditioning apparatus can be readily installed in the instrument panel while being separated from a floor surface of the passenger compartment with a sufficient distance.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

Preferred embodiments of the present invention are described hereinafter with reference to the accompanying drawings.

Figure 1:
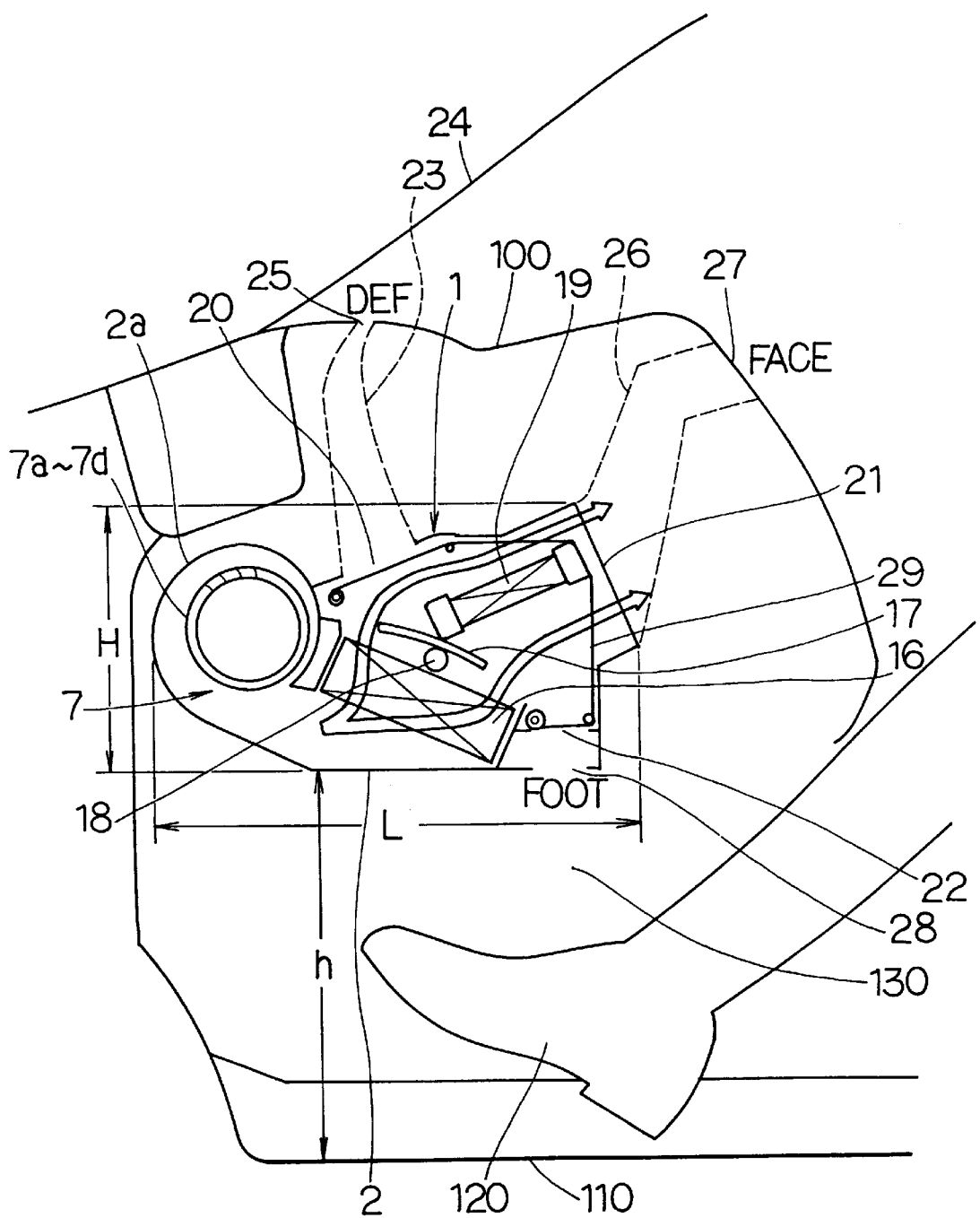
FIG. 1 is a schematic sectional view showing an installation state of an air conditioning apparatus in a vehicle, according to a first preferred embodiment of the present invention.
Figure 2:
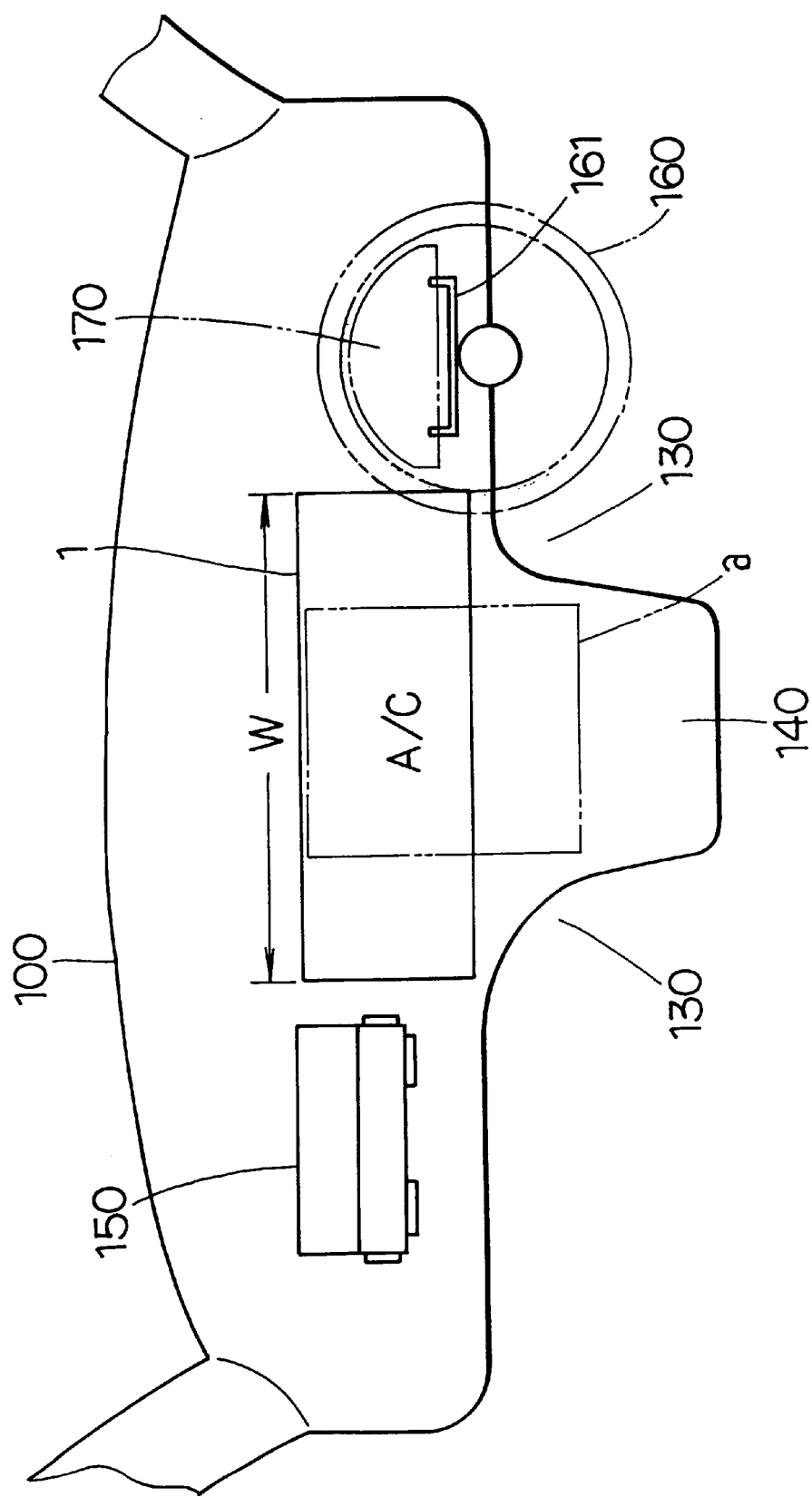
FIG. 2 is a schematic diagrammatic view showing an installation space of the air conditioning apparatus in an instrument of the vehicle.

A first preferred embodiment of the present invention will be now described with reference to FIGS. 1–4. In the first embodiment, a ventilation system of an air conditioning apparatus 1 is an integrated unit, and is disposed at a center portion within an instrument panel 100 in a right-left direction (i.e., width direction) of the vehicle, as shown in FIGS. 1, 2. Further, the air conditioning apparatus 1 is installed in a vehicle to be corresponded to an arrangement shown in FIGS. 1–4 in a front-rear direction, the right-left direction and an up-down direction of the vehicle.

Figure 3:
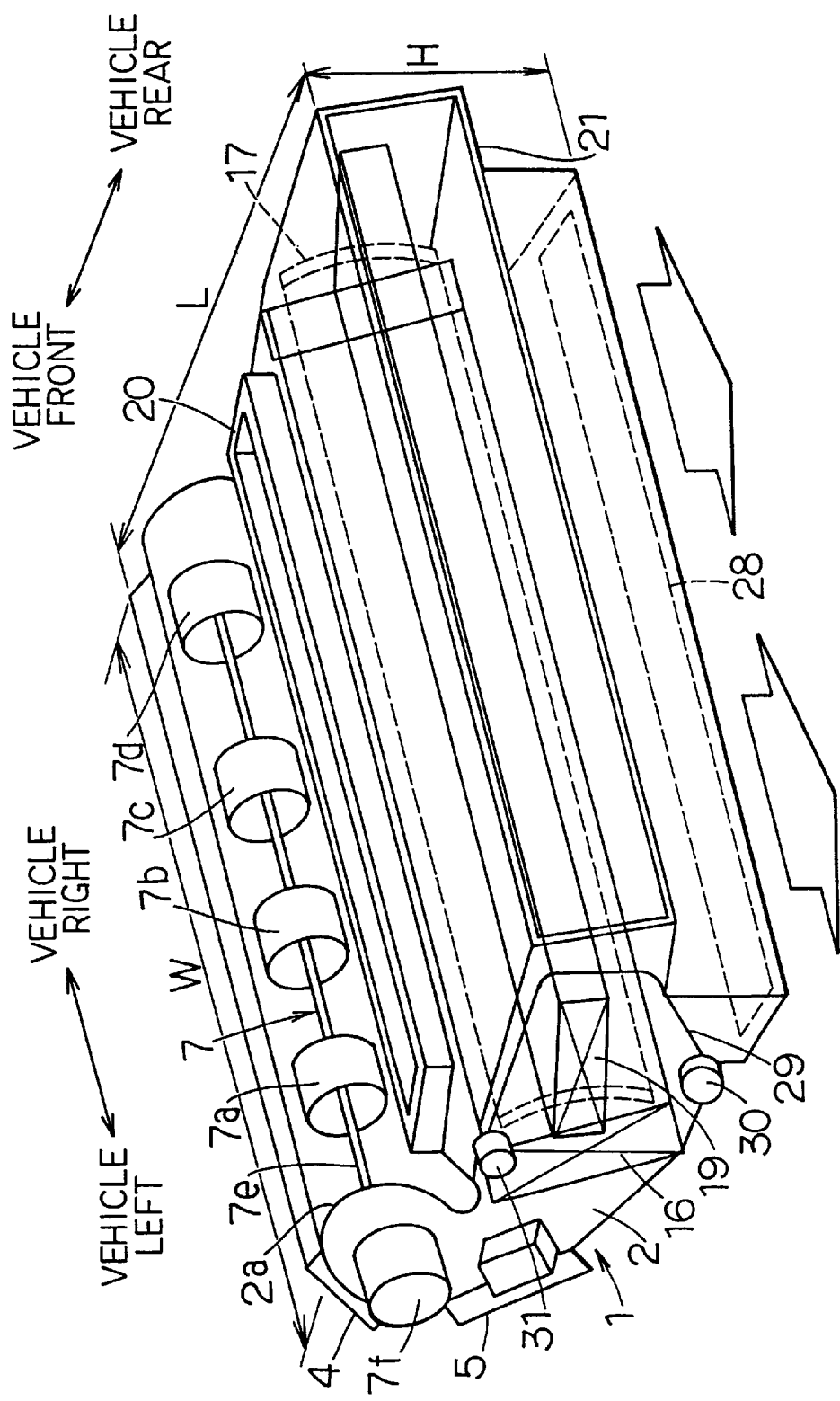
FIG. 3 is a perspective view showing the air conditioning apparatus of the first embodiment.

First, an installation of the air conditioning apparatus 1 in the vehicle will be described. As shown in FIG. 3, in the air conditioning apparatus 1, a dimension H in the up-down direction is smaller than a dimension W in the right-left direction or a dimension L in the front-rear direction of the vehicle. That is, the air conditioning apparatus is formed in a lateral-longer flat shape. In the air conditioning apparatus 1, the dimension W in the right-left direction is the largest dimension, and is 580 mm, for example. The dimension L of the air conditioning apparatus 1 in the front-rear direction is 350 mm, for example, and the dimension H thereof in the up-down direction is 180 mm, for example. That is, in the first embodiment, the dimension W is larger than three times of the dimension H (i.e., W>3H), and the dimension L is approximately equal to twice of the dimension H (i.e., L≈2H).

In the first embodiment, the air conditioning apparatus 1 is formed in the lateral-longer flat shape to improve the installation performance in the vehicle. To sufficiently improve the installation performance of the air conditioning apparatus 1 in the vehicle, preferably, each of the dimension W in the right-left direction and the dimension L in the front-rear direction is larger than 1.5 times of the dimension H in the up-down direction, and the dimension W in the right-left direction is larger than 400 mm. Because the air conditioning apparatus 1 is formed in the lateral-longer flat shape, a bottom surface of the air conditioning apparatus 1 is separated from a floor surface 110 of the passenger compartment to have a sufficient height distance h therebetween when the air conditioning apparatus 1 is installed in the passenger compartment of the vehicle. As a result, the height distance h between the floor surface 110 and the bottom surface of the air conditioning apparatus 1 can be set at a distance more than 300 mm.

Thus, as shown in FIG. 1, at a lower side of the bottom surface of the air conditioning apparatus 1 in the passenger compartment, there is formed a foot space 130 which is enough for a foot portion 120 of a passenger on a front seat (i.e., a driver's seat or a front passenger's seat next to the driver's seat) of the passenger compartment,, Accordingly, as shown in FIG. 2, the air conditioning apparatus 1 can be disposed within the instrument panel 100 at the center in the right-left direction to extend to an upper side of the foot space 130 in the right-left direction. It is compared with a case where an air conditioning apparatus is installed as shown by a chain line "a" in FIG. 2 to have a width dimension similar to that of a center console 140 provided on a lower side of the instrument panel 100 at a center in the right-left direction, the height distance h between the bottom surface of the air conditioning apparatus 1 and the floor surface 110 of the passenger compartment can be made larger. That is, in the first embodiment, because the air conditioning apparatus 1 is formed in the lateral-longer flat shape, the air conditioning apparatus 1 can be disposed in the instrument panel 100 to extend from the center to an upper side of the foot space 130 in the right-left direction of the vehicle.

In the first embodiment, the dimension W in the right-left direction is set to be installed in a space between an air back unit 150 at a side of the front passenger's seat and an attachment stay 161 of a steering wheel 160 within the instrument panel 100. As shown in FIG. 2, an instrument 170 such as a speedometer is provided on the instrument panel at a driver's seat side.

Next, the structure of the air conditioning apparatus 1 formed in the lateral-longer flat shape will be described in detail with reference to FIGS. 3, 4. The air conditioning apparatus 1 includes a resinous air conditioning case 2 having a plurality of division cases. The division cases of the air conditioning case 2 are integrally fastened to form the lateral-longer flat shape. The air conditioning case 2 forms an air passage through which air flows from a front side to a rear side of the vehicle, and each component is accommodated in the air conditioning case 2.

Figure 4:
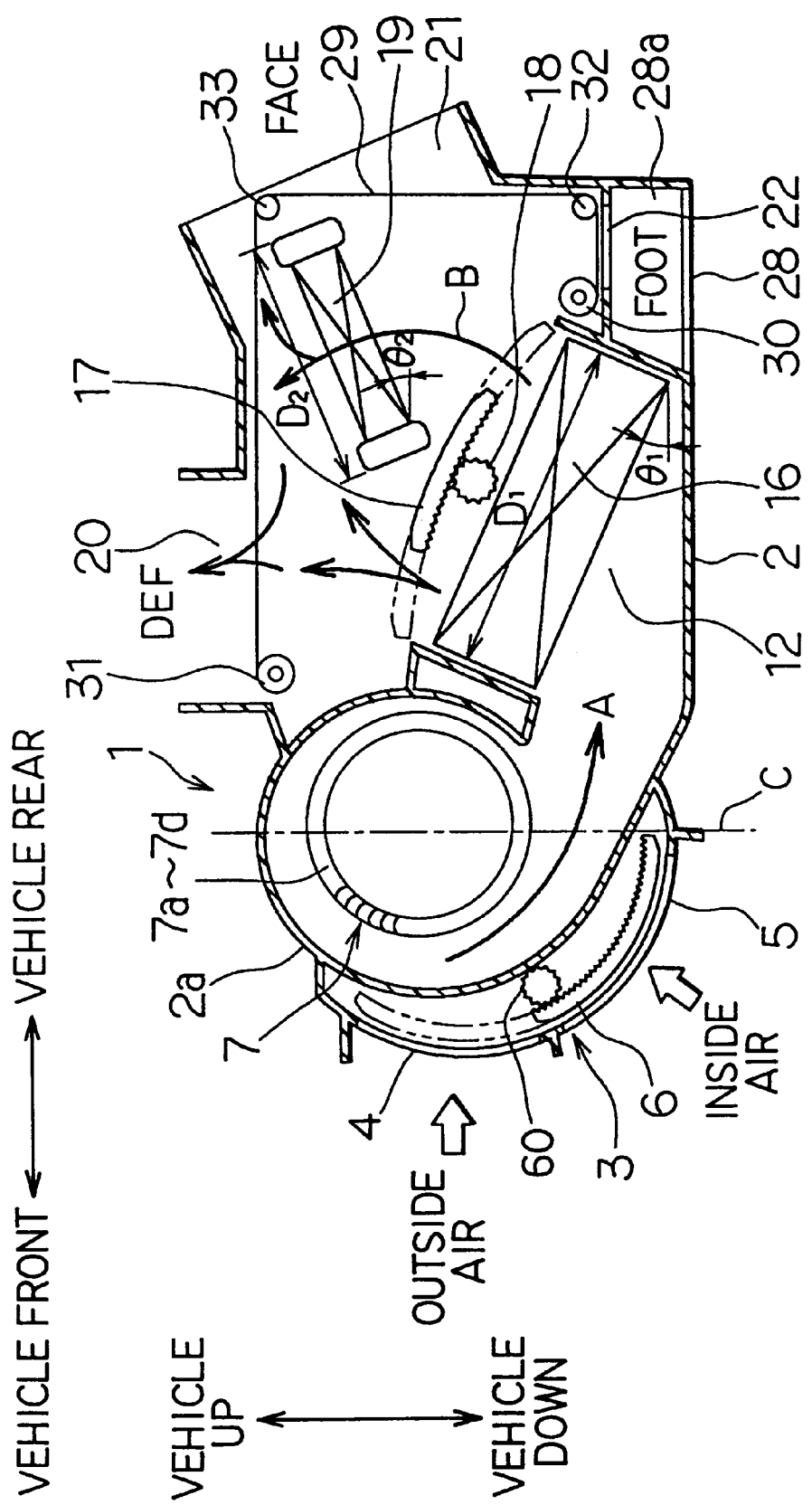
FIG. 4 is a schematic sectional view showing the air conditioning apparatus of the first embodiment.

As shown in FIGS. 3, 4, an inside/outside air switching unit 3 is disposed at a most front side of the air conditioning unit 1. An outside air suction port 4 for sucking outside air (i.e., air outside the passenger compartment) from a front side of the vehicle is provided at an upper side of the inside/outside air switching unit 3. Further, an inside air suction port 5 for sucking inside air (i.e., air inside the passenger compartment) is provided at a lower side of the outside air suction port 4 in the inside/outside air switching unit 3 to be adjacent to the outside air suction port 4. As shown in FIG. 4, the outside air suction port 4 and the inside air suction port 5 are provided in a circular-arc surface at a most front side of the air conditioning case 2.

An inside/outside air switching door 6 for opening and closing the outside air suction port 4 and the inside air suction port 5 is disposed within the inside/outside air switching unit 3. The inside/outside air switching door 6 is formed in a circular-arc shape to slide along the circular-arc surface where the outside air suction port 4 and the inside air suction port 5 are provided. The inside/outside air switching door 6 has an inner toothed surface, and a toothed wheel 60 is disposed to be engaged with the inner toothed surface of the inside/outside air switching door 6. Therefore, the inside/outside air switching door 6 slides in the up-down direction along the circular-arc surface having the both air suction ports 4, 5 by the rotation of the toothed wheel 60. The toothed wheel 60 is connected to and is rotated by an actuator (e.g., servomotor) through a transmission mechanism.

A blower 7 for blowing air sucked from the outside air suction port 4 and the inside air suction port 5 is disposed in the air conditioning case 2. As shown in FIG. 3, the blower 7 includes four fans 7a, 7b, 7c, 7d, and the four fans 7a, 7b, 7c, 7d are rotated by a common single rotation shaft 7e. That is, the rotation shaft 7e is inserted into each of the fans 7a–7d at a center of each fan 7a–7d, so that the fans 7a–7d are rotated by using the single common rotation shaft 7e. A motor 7f for driving the rotation shaft 7e is connected to one end of the rotation shaft 7e, as shown in FIG. 3. Each of the fans 7a–7d is a centrifugal multi-blades fan (e.g., sirocco fan), and the fans 7a–7d are disposed respectively in scroll cases 2a formed integrally with the air conditioning case 2. A suction port for sucking air from the both air suction ports 4, 5 is provided at a side of the fans 7a–7d in an axial direction, and the fans 7a–7d blow the sucked air along scroll shapes of the scroll cases 2a as shown by arrow A in FIG. 4.

In the first embodiment, because the four fans 7a–7d are connected to the common single rotation shaft 7e, a sufficient amount of air can be blown into the passenger compartment even when each fan 7a–7d has a small diameter. That is, it is compared with a case where only a single fan or two fans are provided, each the diameter of the fans 7a–7d can be greatly reduced to be approximately 100 mm. Thus, the blower 7 can be disposed in a small space having the dimension H of 180 mm in the up-down direction.

On the other hand, an evaporator 16 (i.e., cooling heat exchanger) is disposed in the air conditioning case 2 at a downstream side of the blower 7, and a heater core 19 (i.e., heating heat exchanger) is disposed in the air conditioning case 2 at a downstream side of the evaporator 16. In the air conditioning case 2 having the lateral-longer flat shape, there is formed an air passage 12 through which air blown by the blower 7 flows from a vehicle front side toward a vehicle rear side while passing through the evaporator 16 and the heater core 19. The evaporator 16 is disposed at an immediately downstream side of the scroll case 2a to cross all area of the air passage 12.

As shown in FIG. 3, the evaporator 16 has a lateral-longer shape, and a lateral length of the evaporator 16 in the right-left direction of the vehicle is approximately equal to the dimension W of the air conditioning case 2. The evaporator 16 is slightly inclined by an angle θ1 relative to a horizontal direction that is horizontal with respect to the front-rear direction and the right-left direction of the vehicle. Therefore, the evaporator 16 can be disposed in a small space in the up-down direction of the vehicle. In the first embodiment, as shown in FIG. 4, a dimension D1 of the evaporator 16 is 130 mm, for example.

Air is blown from the fans 7a–7d to a lower side of the air passage 12 as shown by arrow A in FIG. 4, and passes through the evaporator 16 upwardly from below. The evaporator 16 is for cooling air while absorbing an evaporation latent heat of a refrigerant of a refrigerant cycle from air. The evaporator 16 is of a laminated type in which a plurality of flat tubes, each of which is formed by connecting two metal thin plates made of aluminum or the like to each other, are laminated to sandwich a corrugated fin between adjacent flat tubes, and then integrally brazed.

An air mixing door (temperature control unit) 17 which is slidable in the front-rear direction of the vehicle is disposed at a direct upper side (i.e., immediately downstream side) of the evaporator 16. The air mixing door 17 is formed by a plate member formed in a circular-arc shape having a large radius of curvature, near a flat plate. As shown in FIG. 3, the air mixing door 17 is also formed in the lateral-longer flat shape having a width dimension approximately equal to the dimension W of the air conditioning case 2 in the right-left direction of the vehicle.

The air mixing door 17 has an inner toothed surface, and a toothed wheel 18 is formed to be engaged with the toothed surface of the air mixing door 17. Therefore, the air mixing door 17 slides in the front-rear direction of the vehicle by the rotation of the toothed wheel 18. Thus, the air mixing door 17 can adjust an amount of air passing through the heater core 19 and an amount of air bypassing the heater core 19 to control the temperature of air blown into the passenger compartment. The toothed wheel 18 is connected to an actuator (e.g., servomotor) through a transmission mechanism to be rotated. Heater core 19 heats air having passed through the evaporator 16. Hot water (engine-cooling water) flows through the heater core 19 to heat air passing through the heater core 19. The heater core 19 is disposed to cross the all area of the air passage 12 in the right-left direction of the vehicle to extend from the upper side of the air mixing door 17 to a vehicle rear side.

Similarly to the evaporator 16, the heater core 19 has a lateral-longer shape, and a lateral length of the heater core 19 in the right-left direction of the vehicle is approximately equal to the dimension W of the air conditioning case 2. The heater core 19 is slightly inclined by an angle θ2 relative to a horizontal direction. Therefore, the heater core 19 can be disposed in a small space in the up-down direction of the vehicle. In the first embodiment, a dimension D2 of the heater core 19 is 90 mm, for example. However, the inclination direction of the heater core 19 is opposite to that of the evaporator 16. That is, a vehicle rear end of the evaporator 16 is inclined toward a lower side, and a vehicle rear end of the heater core 19 is inclined toward an upper side. Further, a part of the evaporator 16 at a vehicle rear side and a part of the heater core 19 at a vehicle front side are overlapped in the front-rear direction to have a predetermined distance therebetween in the up-down direction of the vehicle.

The heater core 19 is of a laminated type in which a plurality of flat tubes, each of which is formed by connecting two metal thin plates made of aluminum or the like to each other, are laminated to sandwich a corrugated fin between adjacent flat tubes, and then integrally brazed.

Next, an air outlet mode switching mechanism will be described. In the air conditioning case 2 at a downstream air passage side, a defroster opening portion 20, a face opening portion 21 and a foot opening portion 22 are respectively provided. The defroster opening portion 20 is provided in an upper surface of the air conditioning case 2 at an approximate center position in the front-rear direction of the vehicle. As shown in FIG. 1, the defroster opening portion 20 is connected to a defroster duct 23, and a defroster air outlet for blowing conditioned air toward an inner surface of a windshield 24 is provided at a top end of the defroster duct 23. The face opening portion 21 is provided in the upper surface of the air conditioning case 2 at a vehicle rear side of the defroster opening portion 20. The face opening portion 21 is connected to a face duct 26, and a face air outlet 27 for blowing conditioned air toward the head portion of a passenger in the passenger compartment is provided at a top end of the face duct 26. The foot opening portion 22 is formed at a bottom side in the air conditioning case 2 on a most rear side of the vehicle. In the first embodiment, a foot air outlet 28 for blowing air toward the foot portion 120 of the passenger is directly formed in the bottom surface of the air conditioning case 2 at a direct lower side of the foot opening portion 22. Therefore, air can be blown directly downwardly toward the foot space 130 from the foot air outlet 28. In the first embodiment, each of the opening portions 20–22 and the foot air outlet 28 is formed in the lateral-longer shape which has a dimension approximately equal to the dimension W in the right-left direction of the vehicle.

The defroster opening portion 20, the face opening portion 21 and the foot opening portion 22 are opened and closed by an air outlet mode door 29 (hereinafter referred to as "film door 29") formed in a film like. The film door 29 is made of resin having a sufficient flexible performance and a sufficient strength, such as polyethylene resin. The film door 29 has a plurality of openings at predetermined positions. The film door 29 has a width dimension approximately equal to the dimension W of the air conditioning case 2 in the right-left direction of the vehicle. By moving the film door 29 at a predetermined position, an air outlet mode can be selected in the air conditioning apparatus 1.

As shown in FIG. 4, a driving shaft 30 and a driven shaft 31 are rotatably held in the air conditioning case 2. Two ends of the film door 29 are fixed to and wound around the driving shaft 30 and the driven shaft 31, respectively. Intermediate guide shafts 32, 33 are disposed, so that the film door 29 slides along an inner wall surface of the air conditioning case 2 in a specific tension to open and close the opening portions 20–22.

The driving shaft 30 is driven by an actuator such as a step motor, and the rotation of the driving shaft 30 is transmitted to a driven shaft 31 through a rotation transmission mechanism. When the driving shaft 30 is rotated in forward and reverse directions by the actuator, the driven shaft 31 is also rotated in the forward and reverse directions with the rotation of the driving shaft 30. Therefore, when one end of the film door 29 is wound around the driving shaft 30, the other end of the film door 29 is rewound around the driven shaft 31. On the other hand, when one end of the film door 29 is rewound around the driving shaft 30, the other end of the film door 29 is wound around the driven shaft 31. The film door 29 having the openings is stopped to a predetermined position by the rotation of the driving shaft 30 in the forward and reverse directions, so that a communication and an interruption between the openings of the film door 29 and the air outlet opening portions can be switched.

In the first embodiment, the air conditioning case 2 is divided into a plurality of division cases so that various components can be accommodated in the air conditioning case 2. For example, the scroll case 2a of the air conditioning case 2 is divided into a front side portion and a rear side portion with respective to a center chain line C of the fan 7 in the front-rear direction of the vehicle. Further, the rear side portion is further divided into a plurality portions such as a lower portion at a side of the evaporator 16 and an upper portion at a side of the heater core 19.

Next, the operation of the air conditioning apparatus 1 according to the first embodiment will be described.

(1) FOOT MODE

When the foot mode is set, the film door 29 moves at a predetermined position so that the foot opening portion 22 is fully opened, the defroster opening portion 20 is slightly opened and the face opening portion 21 is closed. In this case, air blown by the blower 7 passes through the evaporator 16, the amount of air passing through the heater core 19 and the amount of air bypassing the heater core 19 is adjusted by the air mixing door 17 to control the temperature of blown into the passenger compartment. In FIG. 4, arrow B indicates the flow of air during a defroster mode. During the foot mode, because the air mixing door 17 slides to the vehicle rear side (i.e., right side in FIG. 4), air passes through the heater core 19 from an upper side downwardly. Conditioned air having been temperature-adjusted in the heater core 19 is blown directly downwardly toward the foot portion 120 from the foot air outlet 28 through the foot opening portion 22.

During the foot mode, a part of conditioned air can be introduced into the defroster opening portion 20, and can be blown toward the inner surface of the windshield 24 from the defroster air outlet 25 through the defroster duct 23. In the first embodiment, because the foot air outlet 28 is provided at a direct upper side of the foot portion 120, conditioned air can be directly downwardly blown toward the foot portion 120 of the passenger. Further, the foot air outlet 28 has the width dimension approximately equal to the dimension W of the air conditioning case 2 in the right-left direction of the vehicle to extend from the center in the right-left direction to the driver's seat side and the front passenger's seat side on an upper side of the foot space 130. Therefore, a right end of the foot air outlet 28 can be made to be proximate to the right foot portion of a driver on the driver's seat, and a left end of the foot air outlet 28 can be made to be proximate to the left foot portion of a front passenger on the front passenger's seat. Thus, conditioned air can be blown toward the all foot portion 120 in the passenger compartment, so that heating capacity can be improved.

Further, because the foot air outlet 28 is provided in the air conditioning case 2 at the direct upper side of the foot portion 120 so that air can be directly downwardly blown toward the foot portion 120, a foot duct separated from the air conditioning case 2 is not necessary, or a simple foot duct having a short distance can be used. As shown in FIGS. 3, 4, in the first embodiment, the foot opening portion 22 and the foot air outlet 28 are connected only using a communication path 28a having a small distance (e.g., 60 mm) without using any separated foot duct.

However, the communication path 28a and the foot air outlet 28 may be omitted, and the foot opening portion 22 may be used as an air outlet so that conditioned air is directly downwardly blown from the foot opening portion 22.

When the air conditioning apparatus 1 is installed in the vehicle, the bottom surface of the air conditioning case 2 can be separated from the floor surface at the height distance of h higher than 300 mm; and therefore, the foot space 130 for the foot portion 120 of the passenger can be sufficiently provided at a lower side of the air conditioning case 2. Actually, when the height distance h of the bottom surface of the air conditioning case 2 from the floor surface 110 is higher than 200 mm, the foot portion 120 of the passenger is not impeded.

(2) DEFROSTER MODE

When the defroster mode is set, the film door 29 is moved by the actuator to a predetermined position. Therefore, the opening of the film door 29 fully opens the defroster opening portion 20, and the film portion of the film door 29 closes the face opening portion 21 and the foot opening portion 22. During the defroster mode, the inside/outside air switching door 6 generally sets the entire outside air mode to improve the defrosting performance of the windshield 24. Thus, the blower 7 sucks outside air, and the sucked outside air is blown into the air passage 12. The outside air in the air passage 12 is blown toward the heater core 19 after passing through the evaporator 16.

During the defroster mode, because the air mixing door 17 slides at a vehicle front side (i.e., left side in FIG. 4), outside air flows into the heater core 19 from below as shown by arrow B in FIG. 4 so that the temperature of outside air to be blown into the defroster opening portion 20 can be adjusted. The outside air having been heated flows upwardly from the heater core 19 into the defroster opening portion 20, and is blown toward the inner surface of the windshield 24 from the defroster air outlet 25 through the defroster duct 23 to defrost the windshield 24.

In the first embodiment, the air conditioning apparatus 1 is formed in the lateral-longer flat shape, and the defroster opening portion 20 has the lateral-longer shape having the width dimension approximately equal to the dimension W of the air conditioning case 2 in right-left direction. By using the lateral-longer shape of the defroster opening portion 20, the defroster duct 23 connecting the defroster opening portion 20 and the defroster air outlet 25 can be disposed approximately linearly to have a short distance. Therefore, press loss in the defroster duct 23 can be reduced, and the amount of air blown from the defroster air outlet 25 is increased. Thus, during the defroster mode, the defrosting performance of the windshield 24 can be improved, and air-blowing noise from the air conditioning apparatus 1 can be reduced.

(3) FACE MODE

When the face mode is set, the film door 29 is moved by the actuator to a predetermined position. Therefore, the opening of the film door 29 fully opens the face opening portion 21, and the film portion thereof closes the defroster opening portion 20 and the foot opening portion 22. During the face mode, because the refrigerant cycle is operated, air blown by the blower 7 is cooled by the evaporator 16. When a maximum cooling state is set during the face mode, the air mixing door 17 is driven by the toothed wheel 18 to an intermediate position in the front-rear direction. Therefore, as shown in FIG. 1, air blown by the blower 7 is cooled in the evaporator 16, and flows into upper and lower spaces of the heater core 19 through air passages formed at vehicle front and rear sides of the air mixing door 17 while bypassing the heater core 19. As shown in FIG. 1, the upper and lower spaces of the heater core 19 directly communicate with the face opening portion 21. Therefore, air linearly flows into the face opening portion 21 through the upper and lower spaces of the heater core 19, and is blown into the passenger compartment from the face air outlet 27 through a face duct 26.

Thus, in the maximum cooling state during the face mode, air cooled in the evaporator 16 is blown into the passenger compartment without being heated in the heater core 19. In the first embodiment, the air suction ports 4, 5, the blower 7 and the evaporator 16 are provided approximately linearly from a vehicle front side to a vehicle rear side in this order, air having cooled in the evaporator 16 flows into the face opening portion 21 after linearly passing through upper and lower spaces of the heater core 19, and the face opening portion 21 is positioned at an immediately downstream side of the heater core 19. Therefore, during the maximum cooling state, pressure loss in a cool air passage in the air conditioning case 2 can be greatly reduced, and the amount of air blown into the face opening portion 21 can be increased.

Further, the face opening portion 21 has the lateral-longer shape having the width dimension approximately equal to the dimension W of the air conditioning case 1. By using the lateral-longer shape of the face opening portion 21, the face duct 23 connecting the face opening portion 21 and the face air outlet 27 can be formed approximately linearly to have a short distance. Therefore, press loss in the face duct 26 can be reduced, and the amount of air blown from the face air outlet 27 can be increased. Thus, during the face mode, the cooling performance for the passenger compartment can be improved. Further, because the face opening portion 21 is formed in the lateral-longer shape, air having a low temperature can be blown from a wide width toward a wide area of the upper portion of the passenger so that cooling feeling for the passenger compartment can be improved.

A hot water valve is disposed in a hot water circuit in which hot water flowing into the heater core 19 circulates, and hot water flowing into the heater core 19 is closed by the hot water valve during the maximum cooling state.

When the temperature of the passenger compartment is decreased, and the cooling load for the passenger compartment is reduced, a temperature control state is set from the maximum cooling state. During the temperature control state, the air-mixing door 17 slides to a position so that a part of air having passed through the evaporator 16 is heated in the heater core 19.

According to the first embodiment of the present invention, the air conditioning apparatus 1 is formed in the lateral-longer flat shape, and the air suction ports 4, 5, the blower 7, the evaporator 16, the heater core 19 are disposed approximately linearly from the vehicle front side toward the vehicle rear side. Therefore, in the air passage 12 of the air conditioning case 2, the press loss of air is made smaller, the amount of air blown into the passenger compartment is increased, and noise from the air conditioning apparatus 1 can be reduced. Further, because a space for bending an air passage is not necessary, the size of the air conditioning apparatus 1 can be reduced.

Further, as shown in FIG. 3, because each of the face, foot and defroster opening portions 20–22 has the lateral-longer shape to have a right-left symmetrical shape, air can smoothly uniformly flow through the air passage 12 within the air conditioning case 2 in the right-left direction; and therefore, the amount of air blown toward the passenger compartment can be further increased and noise from the air conditioning apparatus 1 can be further reduced. Further, because the all ventilation structure of the air conditioning apparatus 1 approximately has a right-left symmetrical shape, the air conditioning apparatus 1 can be applied to both of a right steering wheel vehicle and a left steering wheel vehicle. Thus, the air conditioning apparatus 1 can be produced in a low cost.

In the resent years, the components such as the air conditioning apparatus 1, the air back unit 150, the instrument 170 are integrally installed in the instrument panel 100 beforehand, and the instrument panel 100 integrated with the components is assembled into the vehicle at a front side of the passenger compartment. That is, a modular-construction assemblage is applied to the vehicle. In the modular-construction assemblage, because the components such as the air conditioning apparatus 1 is beforehand assembled in the instrument panel 100 in works, the assembling step of the components such as the air conditioning apparatus 1 can be made simple, and the whole installation space of the components can be reduced. Therefore, the space for a passenger in the passenger compartment can be increased. According to the first embodiment of the present invention, when the modular-construction assemblage is used and the dimension H of the air conditioning apparatus 1 in the up-down direction is 180 mm, an entire dimension of an instrument modular unit including the air conditioning apparatus 1 in the up-down direction of the vehicle can be restricted to a range of 350–400 mm. However, in a case where the dimension H is 450 mm, the entire dimension of the instrument modular unit in the up-down direction of the vehicle is increased in a range of 500–600 mm; and therefore, the assembling performance is decreased. According to the first embodiment, because the entire dimension of the instrument modular unit can be reduced in the range of 350–400, the instrument modular unit is not affected to a vehicle body, and the assembling performance of the instrument modular unit including the air conditioning apparatus 1 can be improved.

Figure 5:
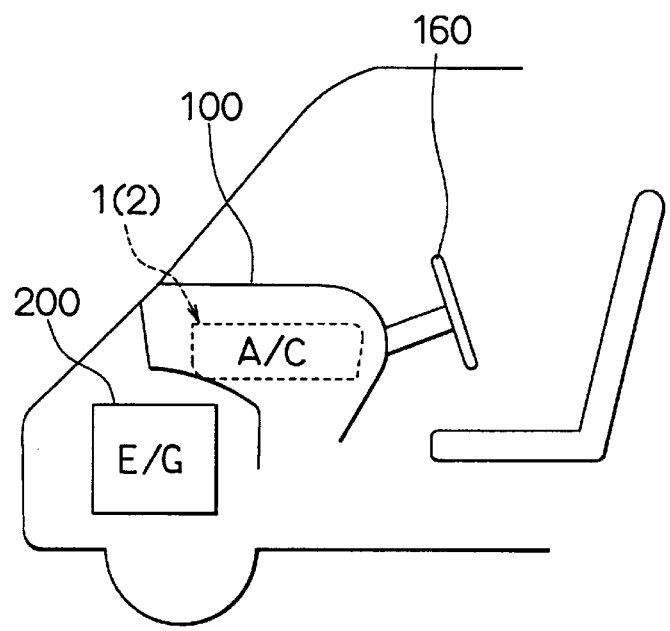
FIG. 5 is a schematic view showing an installation state of an air conditioning apparatus in a vehicle, according to a second preferred embodiment of the present invention.
Figure 9:
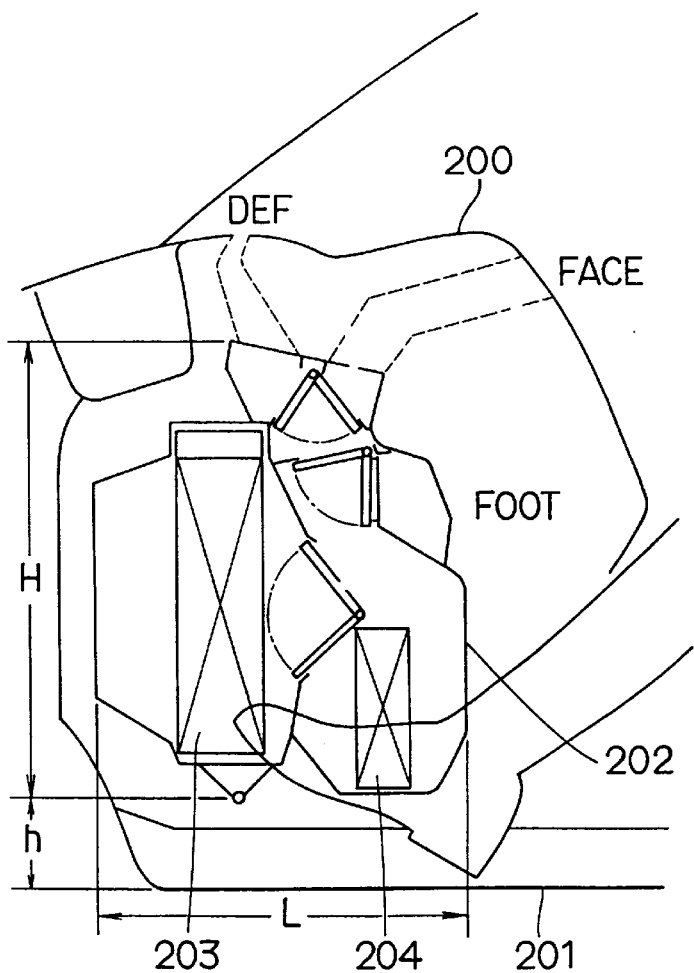
FIG. 9 is a schematic sectional view showing an installation state of a conventional air conditioning apparatus in a vehicle.

A second preferred embodiment of the present invention will be now described with reference to FIG. 5. As shown in FIG. 5, in the second embodiment, the air conditioning apparatus 1 described in the first embodiment of the present invention is applied to a vehicle in which an engine 200 is disposed at a front lower side to be dug into a lower side of the instrument panel. Even in the vehicle, the air conditioning apparatus 1 having the lateral-longer flat shape can be readily installed within the instrument panel 100 of the vehicle, as shown in FIG. 5. The other portions of the air conditioning apparatus 1 are similar to those in the first embodiment, and the explanation thereof is omitted.

Figure 6:
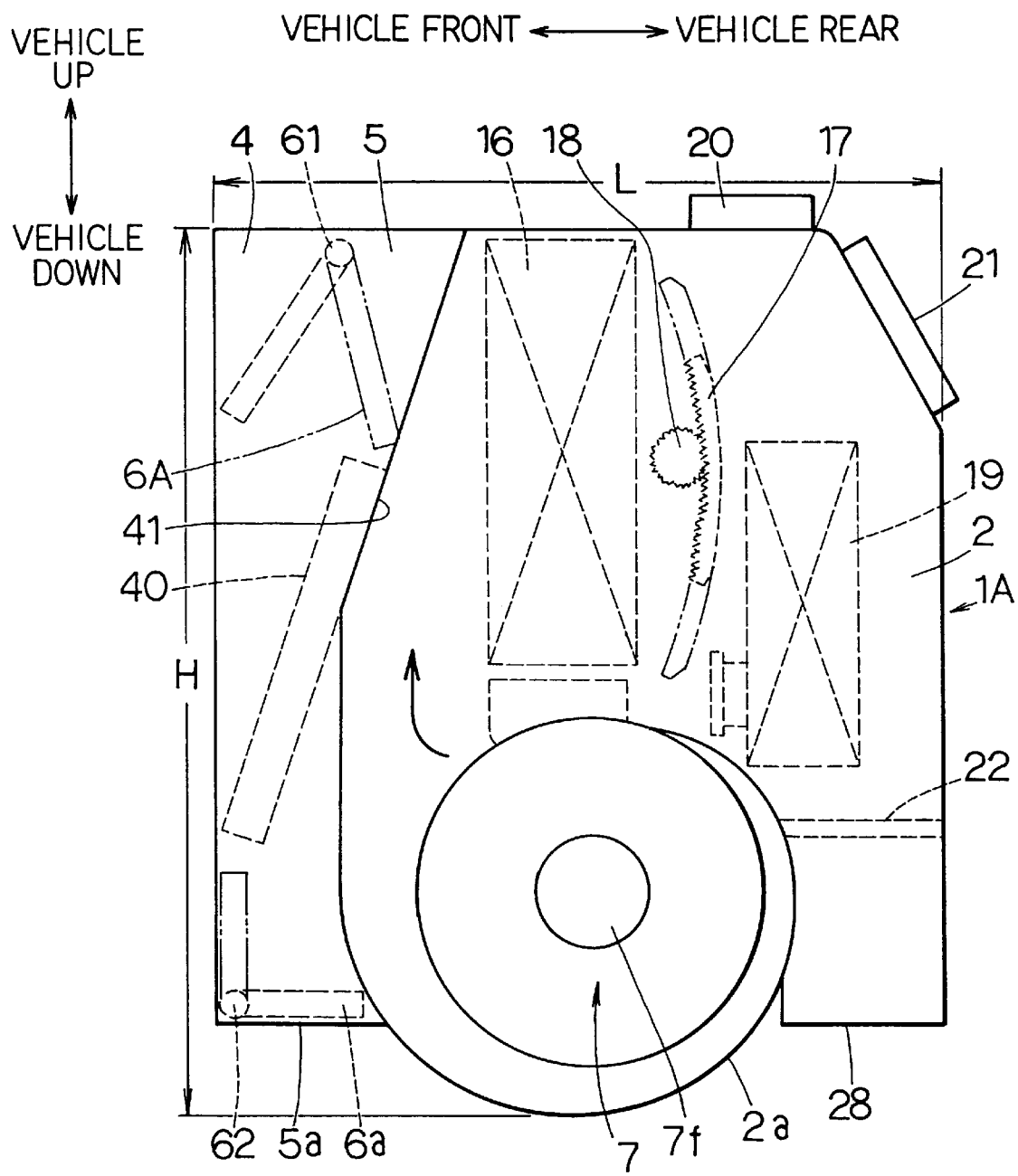
FIG. 6 is a side view showing an air conditioning apparatus according to a third preferred embodiment of the present invention.
Figure 7:
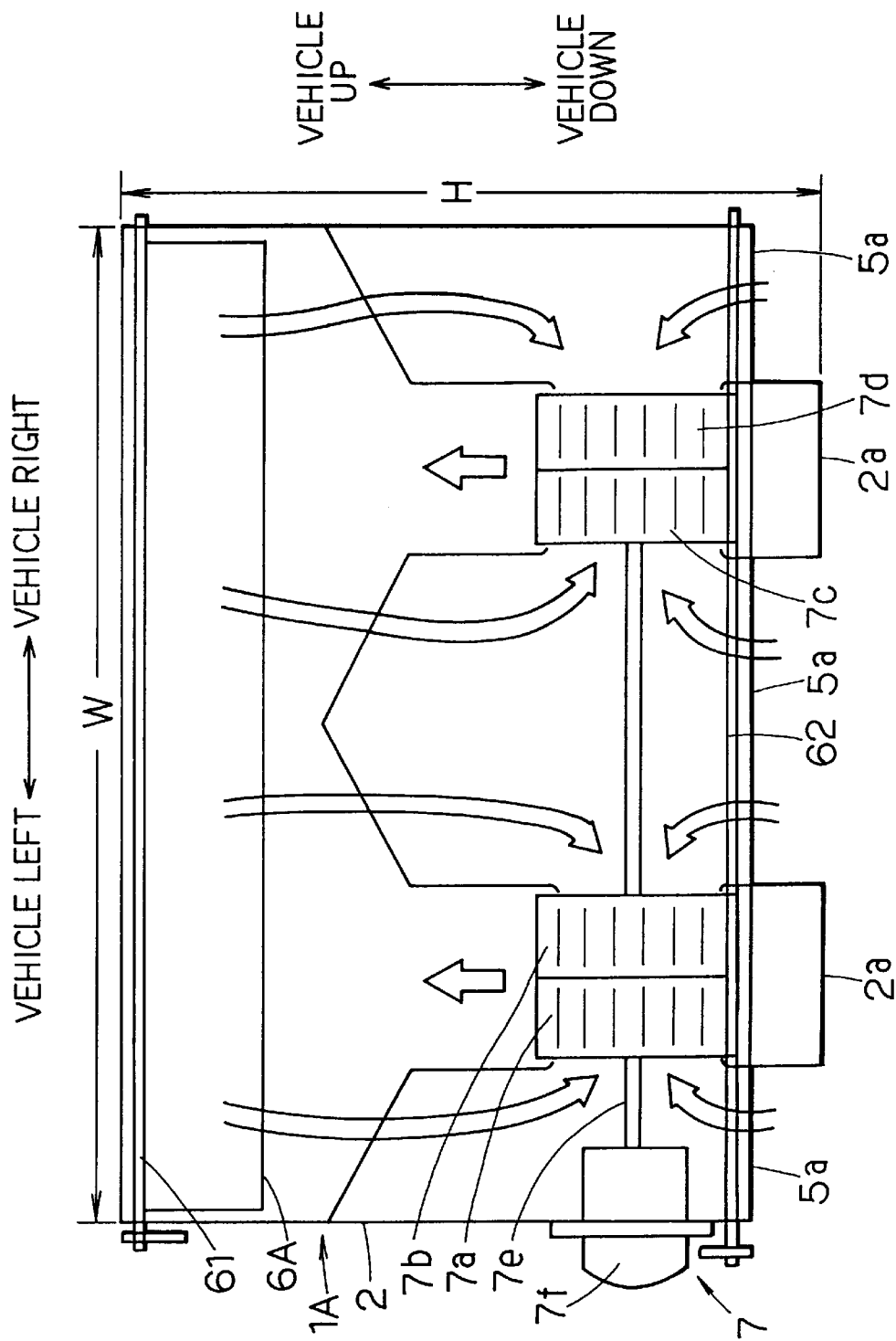
FIG. 7 is a schematic sectional view showing the air conditioning apparatus according to the third embodiment.

A third preferred embodiment of the present invention will be now described with reference to FIGS. 6, 7. In the third embodiment, an air conditioning apparatus 1A has a smaller dimension L in the front-rear direction of the vehicle and a larger dimension H in the up-down direction of the vehicle, as compared with the air conditioning apparatus in the first and second embodiments. That is, as shown in FIGS. 6, 7, the air conditioning apparatus 1 (air conditioning case 2) is formed in a lateral-longer shape having approximately a rectangle in cross section. In the third embodiment, for example, a dimension W of the air conditioning apparatus 1A (air conditioning case 2) in the right-left direction of the vehicle is 500 mm, the dimension H in the up-down direction of the vehicle is 280 mm, and the dimension L in the front-rear direction of the vehicle is 230 mm.

In the third embodiment, the evaporator 16 is disposed in the air conditioning case 2 approximately vertically at a center portion in the front-rear direction of the vehicle, the slide-type air mixing door 17 and the heater core 19 are disposed at a vehicle rear side of the evaporator 16. The blower 7 is disposed at a lower side of the evaporator 16, the air mixing door 17 and the heater core 19 so that the axial direction (rotation shaft) of the blower 7 is positioned in the right-left direction of the vehicle.

A width dimension of the evaporator 16 in the right-left direction is approximately equal to the dimension W of the air conditioning case 2, a dimension of the evaporator 16 in the up-down direction is 130 mm, and a dimension of the evaporator 16 in the front-rear direction is 50 mm. That is, the evaporator 16 is formed in a lateral-longer shape. The heater core 19 is also formed in a lateral-longer shape in which a dimension in the right-left direction is 450 mm sightly shorter than that the dimension W of the air conditioning case 2, a dimension in the up-down direction is 90 mm and a dimension in the front-rear direction is 27 mm.

As shown in FIG. 6, the outside air suction port 4 and the inside air suction port 5 are provided adjacently at a most front upper side of the air conditioning case 2, and are opened and closed by a plate-like inside/outside air door 6A rotated around a rotation shaft 61. Further, a supplementary inside air suction port 5a is provided at a most front lower side of the air conditioning case 2, and is opened and closed by a plate-like inside/outside air switching door 6a.

Thus, air introduced from the air suction ports 4, 5 flows in the air conditioning case 2 from an upper side downwardly, and is sucked into the centrifugal fans 7a–7d of the blower 7 after passing through an air filter 40 for filtering dust contained in air. On the other hand, inside air introduced from the supplementary inside air suction port 5a is directly sucked into the centrifugal fans 7a–7d, as shown in FIG. 7. As shown in FIG. 7, because an air outlet portion of the scroll case 2a accommodating the centrifugal fans 7a–7d is toward a vehicle upper side, air blown from the centrifugal fans 7a–7d flows upwardly. Thereafter, as shown in FIG. 6, air flows along an inclination guide surface 41 so that the flow of air is changed to pass through the evaporator 16 from a vehicle front side to a vehicle rear side. The air mixing door 17 adjusts an amount of air passing through the heater core 19 and an amount of air bypassing the heater core 19 to adjust the temperature of air blown into the passenger compartment from the opening portion 20–23 which are opened and closed by a film door.

According to the third embodiment, the dimension H (about 280 mm) of the air conditioning case 2 in the up-down direction of the vehicle becomes larger as compared with that in the first and second embodiment. However, in the third embodiment, the dimension L (about 230 mm) of the air conditioning case 2 in the front-rear direction of the vehicle becomes smaller. Thus, the air conditioning apparatus 1A of the third embodiment is suitable for a vehicle having a restricted dimension in the front-rear direction.

Figure 8:
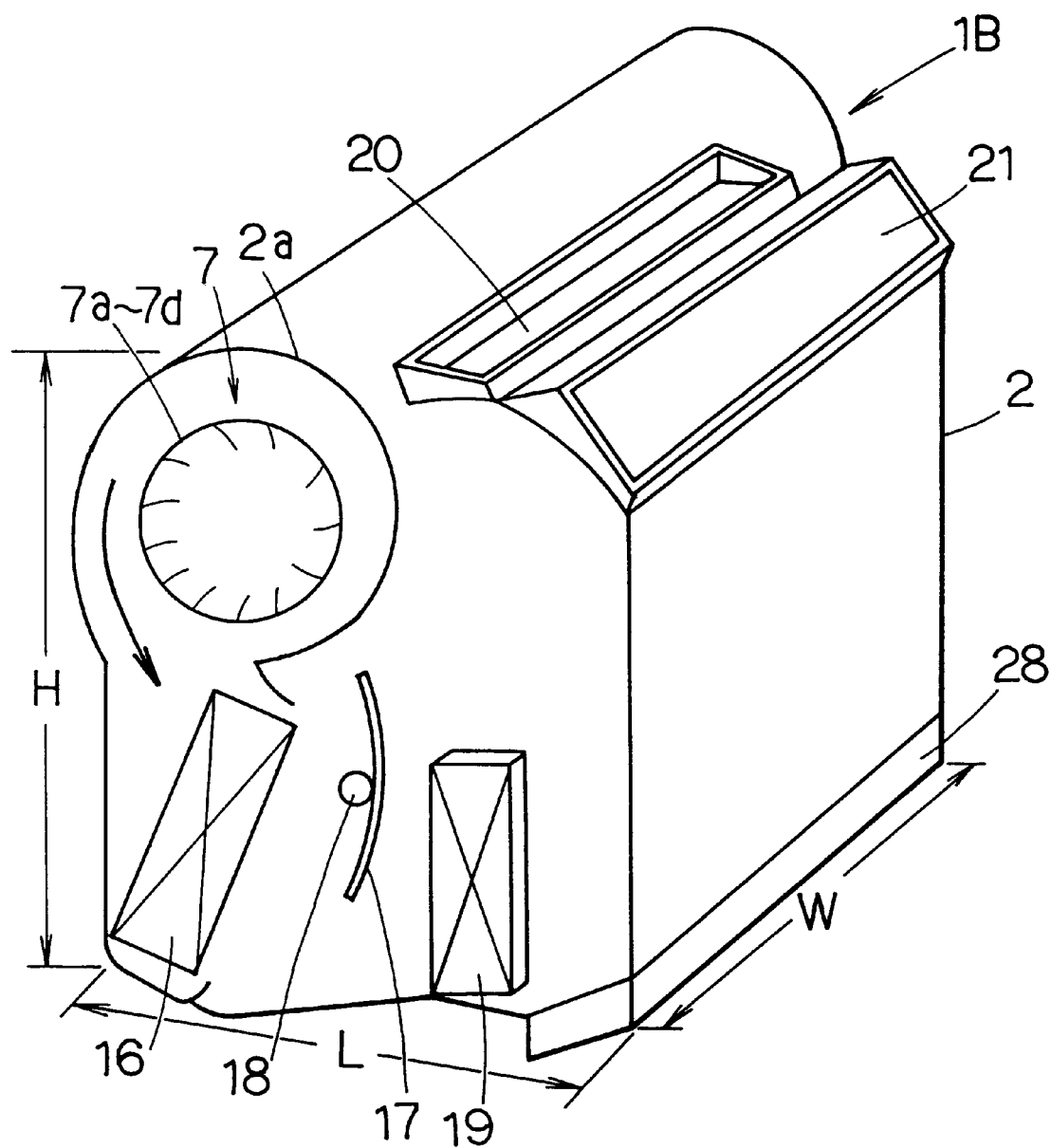
FIG. 8 is a perspective view showing an air conditioning apparatus according to a fourth preferred embodiment of the present invention.

A fourth preferred embodiment of the present invention will be now described with reference to FIG. 8. In the above described third embodiment, the blower 7 is disposed in the lower side of the air conditioning case 2a, and the evaporator 16, the air mixing door 17 and the heater core 19 are disposed at the upper side of the blower 7. However, in the fourth embodiment, as shown in FIG. 8, the blower 7 is disposed at an upper side of the air conditioning case 2 in the air conditioning case 2, and the evaporator 16, the air mixing door 17 and the heater core 19 are disposed at a lower side of the blower 7. The other portions of an air conditioning apparatus 1B of the fourth embodiment are similar to those in the third embodiment, and the explanation thereof is omitted. Thus, in the air conditioning apparatus 1B of the fourth embodiment, the dimension W in the right-left direction of the vehicle, the dimension H in the up-down direction of the vehicle and the dimension L in the front-rear direction of the vehicle can be set similarly to those in the third embodiment.

Although the present invention has been fully described in connection with the preferred embodiments thereof with reference to the accompanying drawings, it is to be noted that various changes and modifications will become apparent to those skilled in the art.

For example, in each of the above-described embodiments, the blower 7 including the four centrifugal fans 7a–7d are used. However, a single lateral-longer cross flow fan may be used instead of the fans 7a–7d. Further, the present invention may be applied to an air conditioning apparatus in which the evaporator 16 or the heater core 19 is not disposed.

Such changes and modifications are to be understood as being within the scope of the present invention as defined by the appended claims.

What is claimed is:

1. An air conditioning apparatus for a vehicle having right and left foot spaces below an instrument panel in a passenger compartment at right and left sides of a center console, said air conditioning apparatus being disposed within the instrument panel, said air conditioning apparatus comprising:

a case for forming an air passage through which air is blown from a front side toward a rear side in a front-rear direction of the vehicle, said case having a longest dimension in a right-left direction of the vehicle; and a heat exchanger for adjusting a temperature of air to be blown into the passenger compartment of the vehicle, said heat exchanger being disposed in said case in such a manner that a longest dimension of said heat exchanger is in the right-left direction, wherein said case is disposed within the instrument panel at a center in the right-left direction to extend from said center to upper sides of the right and left foot spaces in said right-left direction without being inserted into the center console.

2. The air conditioning apparatus according to claim 1, further comprising a blower for blowing air into the passenger compartment through said air passage, said blower having a rotation shaft, wherein said blower is disposed in said case at an upstream side of said heat exchanger in such a manner that said rotation shaft of said blower is positioned in the right-left direction.

3. The air conditioning apparatus according to claim 2, wherein said blower is disposed in said case at a front side of said heat exchanger in said front-rear direction.

4. The air conditioning apparatus according to claim 2, wherein said blower is disposed in said case at a lower side relative to said heat exchanger in such a manner that air blown by said blower passes through said heat exchanger from a front side toward a rear side in said front-rear direction after flowing from a lower side to an upper side in an up-down direction of the vehicle.

5. The air conditioning apparatus according to claim 2, wherein said blower is disposed in said case at an upper side relative to said heat exchanger in such a manner that air blown by said blower passes through said heat exchanger from a front side toward a rear side in said front-rear direction after flowing from an upper side to a lower side in an up-down direction of the vehicle.

6. The air conditioning apparatus according to claim 2, wherein each of said blower and said heat exchanger has a dimension in said right-left direction of the vehicle, approximately equal to that of said case.

7. The air conditioning apparatus according to claim 2, wherein said blower has a plurality fans connected to and rotated around said rotation shaft.

8. The air conditioning apparatus according to claim 1, wherein:

said air conditioning case has a first dimension in the right-left direction, a second dimension in the front rear direction and a third dimension in an up-down direction of the vehicle; and said first dimension of said case is larger than 1.5 times of said third dimension of said case.

9. The air conditioning apparatus according to claim 8, wherein each of said first dimension and said second dimension of said case is larger than 1.5 times of said third dimension of said case.

10. The air conditioning apparatus according to claim 8, wherein said first dimension of said case is larger than 400 mm.

11. The air conditioning apparatus according to claim 1, wherein said case is disposed to have a predetermined distance more than 200 mm between a bottom surface of said case and a floor surface of the passenger compartment, when said case is installed in the vehicle.

12. The air conditioning apparatus according to claim 1, wherein:

said heat exchanger includes a cooling heat exchanger for cooling air passing therethrough and a heating heat exchanger for heating air passing therethrough;

said cooling heat exchanger is disposed at an upstream side of said heating heat exchanger;

each of said cooling heat exchanger and said heating heat exchanger is disposed in said case in such a manner that the longest dimension is in said right-left direction; and said cooling heat exchanger and said heating heat exchanger are slightly inclined respectively by predetermined angles relative to a horizontal surface within said case.

13. The air conditioning apparatus according to claim 1, wherein:

said case having an opening portion through which air is blown into the passenger compartment; and said opening portion is provided in a lateral-longer shape to have a dimension in the right-left direction, approximately equal to that of said case.

14. The air conditioning apparatus according to claim 13, wherein:

said opening portion has a foot opening for blowing air toward the right and left foot spaces; and said foot opening is provided in said case in such a manner that air is directly downwardly blown from said foot opening toward the right and left foot spaces.

15. An air conditioning apparatus for a vehicle having an instrument panel at a front side of a passenger compartment, said air conditioning apparatus being disposed within the instrument panel, said air conditioning apparatus comprising:

a blower for blowing air into the passenger compartment, said blower having a rotation shaft extending in a right-left direction of the vehicle;

a heat exchanger for adjusting a temperature of air blown from said blower; and a case for accommodating said blower and said heat exchanger and for forming an air passage through which air flows from a front side toward a rear side in a front-rear direction of the vehicle, said case having a longest dimension in said right-left direction of the vehicle, wherein said heat exchanger is disposed in said case in such a manner that a longest dimension of said heat exchanger is in said right-left direction.

16. The air conditioning apparatus according to claim 15, wherein:

said rotation shaft of said blower has a dimension in said right-left direction of the vehicle, approximately equal to that of said case; and said heat exchanger has a dimension in said right-left direction of the vehicle, approximately equal to that of said case.

17. An installation structure of an air conditioning apparatus for blowing air into a passenger compartment of a vehicle and for adjusting a temperature of air blown into the passenger compartment, said structure comprising:

an instrument panel disposed in said passenger compartment at a front side to form right and left foot spaces for a passenger on a front seat in the passenger compartment, said right and left foot spaces being provided at right and left sides of a center console which is below said instrument panel at a center in a right-left direction of the vehicle, wherein:

said air conditioning apparatus including a case for forming an air passage through which air is blown from a front side toward a rear side in a front-rear direction of the vehicle, said case having a longest dimension in said right-left direction, and a heat exchanger for adjusting the temperature of air to be blown into the passenger compartment of the vehicle, said heat exchanger being disposed in said case in such a manner that a longest dimension of said heat exchanger is in said right-left direction; and said air conditioning apparatus is disposed within said instrument panel at a center in the right-left direction to extend from said center to upper sides of said right and left foot spaces in said right-left direction without being inserted into the center console.

18. The installation structure of said air conditioning apparatus according to claim 17, wherein said air conditioning apparatus is disposed within said instrument panel to have a distance more than 200 mm, between a bottom surface of said case and a floor surface of said passenger compartment.

19. The installation structure of said air conditioning apparatus according to claim 18, wherein:

said air conditioning apparatus has a dimension in the right-left direction, more than 400 mm;

said air conditioning apparatus is disposed at an upper side of said center console to extent to right and left sides in said right-left direction.

20. The installation structure of said air conditioning apparatus according to claim 19, wherein said air conditioning apparatus is disposed in said instrument panel so that air is blown from an approximate all width area of said case in said right-left direction into said passenger compartment.

* * * * *